United States Patent
Ho

[11] Patent Number: 6,038,687
[45] Date of Patent: Mar. 14, 2000

[54] LOOP BACK TEST APPARATUS FOR SMALL COMPUTER SYSTEM INTERFACE

[75] Inventor: Joon Cherl Ho, Seoul, Rep. of Korea

[73] Assignee: LG Semicon Co., Ltd., Choongcheongbuk-Do, Rep. of Korea

[21] Appl. No.: 08/968,039

[22] Filed: Nov. 12, 1997

[30] Foreign Application Priority Data

Dec. 30, 1996 [KR] Rep. of Korea ............... 96-77507

[51] Int. Cl.[7] ............................................ G06F 13/00
[52] U.S. Cl. ..................... 714/30; 714/25; 714/716; 710/52; 710/53
[58] Field of Search ........................... 714/25, 30, 716; 709/105; 711/104, 112; 710/52, 53

[56] References Cited

U.S. PATENT DOCUMENTS

| | | |
|---|---|---|
| 4,965,801 | 10/1990 | DuLac ............................. 710/74 |
| 5,033,049 | 7/1991 | Keener et al. .................... 714/25 |
| 5,421,014 | 5/1995 | Bucher . |
| 5,475,814 | 12/1995 | Tomimitsu . |
| 5,802,327 | 9/1998 | Hawley et al. ................... 710/3 |

*Primary Examiner*—Robert W. Beausoliel, Jr.
*Assistant Examiner*—Wasseem H. Hamdan

[57] ABSTRACT

An improved diagnosis test apparatus and test method for a small computer system interface (SCSI) that are capable of controlling the input/output of SCSI test data and SCSI signal data which are generated by a host computer without using a peripheral SCSI device. The apparatus includes a host computer for inputting/outputting SCSI control data and SCSI test data, and a controller for receiving and temporarily storing the SCSI control data and SCSI test data from the host computer and for outputting the data to the host computer, for thus testing the SCSI.

10 Claims, 5 Drawing Sheets ated. The initiator 10s include host computers 12a and 12b, and SCSI controllers 14a and 14b. The target 20 includes a plurality of peripherals such as a printer 22a, a CD-ROM drive 22b, a scanner 22c, etc.

LOOP BACK TEST APPARATUS FOR SMALL COMPUTER SYSTEM INTERFACE

FIELD OF THE INVENTION

The present invention relates to a diagnosis test apparatus for a small computer system interface (SCSI), and in particular to an improved diagnosis test apparatus for a SCSI interface which performs a diagnostic test by using a SCSI controller on a motherboard.

BACKGROUND OF THE INVENTION

Generally, the small computer system interface (SCSI) is used for more easily installing a peripheral device to a computer system. In the SCSI device, the interface card is called a SCSI host adapter or a SCSI controller and the peripheral device is called a target.

FIG. 1 is a block diagram illustrating a conventional SCSI system.

As shown therein, the conventional SCSI system includes initiators 10 for generating an input/output command, targets 20 for performing a commanded input/output operation in accordance with the control of the initiators 10, respectively, and a SCSI bus for forming a transmission path between the initiator 10 and the target 20.

The initiator 10s include host computers 12a and 12b, and SCSI controllers 14a and 14b. The target 20 includes a plurality of peripherals such as a printer 22a, a CD-ROM drive 22b, a scanner 22c, etc.

When transmitting data over the SCSI bus, there are eight phases involved. There are a bus free phase, an arbitration phase, a selection phase, a reselection phase, a command chase, a data phase, a status phase, and a message phase. Two phases may not exist at the same time. The communication, e.g., a data transmission, is performed by a combination of the above-described phases.

Here, the command phase, the status phase, and the message phase are called information transmission phases, and the SCSI controllers 14a and 14b use the SCSI protocol of the information transmission phase to drive the SCSI bus.

Under the SCSI protocol, the SCSI control signal is communicated from one host computer, e.g., 12a, to the other host computer 12b and to one of the peripherals 22a, 22b, 22c, and 22d of the target 20 through the SCSI bus. The direction of the signal transmission is controlled by the target 20.

The SCSI control signals (SCSI$_{13}$CTL) include eighteen signals designated as BSY, SEL, C/D, I/O, MSG, REQ, ACK, ATN, RST, DB<7: 0, P:>7. These signals are discussed below in more detail.

SEL: A signal which is used when the initiator selects the target, or the target selects the initiator.

C/D: A signal which indicates whether the data on the data bus is related to a command or to data provided by the target.

I/O: A signal which indicates the direction of the data and is provided by the target.

MSG: A signal which is given by the target during the message phase.

REQ: A complementary signal of a REQ/ACK handshake, which signal is provided by the target.

ACK: A signal of an REQ/ACK handshake, which is provided by the initiator.

ATN: A signal which is provided by the initiator for indicating an attention state of the target.

RST: A resetting signal.

DB<7: 0, P>: 7 data bus bits and one parity bit.

There are problems with the conventional SCSI system. In order for the host computer 12a or 12b to test the SCSI controller 14a or 14b, respectively, a target 20 must be connected to the SCSI controller 14a or 14b. Therefore, during a testing operation, the set-up time and cost are increased.

To test a target for data corruption, the host controller must pass data through the SCSI controller. This technique assumes that the SCSI controller is not the source of the data corruption, but this is not always a valid assumption. Hence, there is a problem that a malfunctioning SCSI controller could cause a host computer to misdiagnose a target as the source of data corruption.

SUMMARY OF THE INVENTION

Accordingly, it is an object of the present invention to provide a diagnosis test apparatus and method for a small computer system interface (SCSI) controller which overcomes the aforementioned problem encountered in the conventional art.

It is another object of the present invention to provide an improved diagnosis test apparatus and method for a small computer system interface (SCSI) controller which is capable of more effective diagnosis testing by using only SCSI controller on a mother board.

It is another object of the present invention to provide an improved diagnosis test apparatus and method for a small computer system interface (SCSI) controller which is capable of controlling the input/output of SCSI test data and SCSI signal data which are generated by a host computer without requiring connection of a peripheral device.

To achieve the above objects, there is provided a diagnosis test apparatus and method embodied therein for a small computer system interface (SCSI) controller which includes a host computer for inputting/outputting SCSI computer control data and SCSI test data, and a controller for receiving and temporarily storing the SCSI control data and SCSI test data from the host computer and for outputting the stored data to the host computer, for thus testing the system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit of the present invention, and wherein.

DETAILED DESCRIPTION OF THE INVENTION

Figure 1:
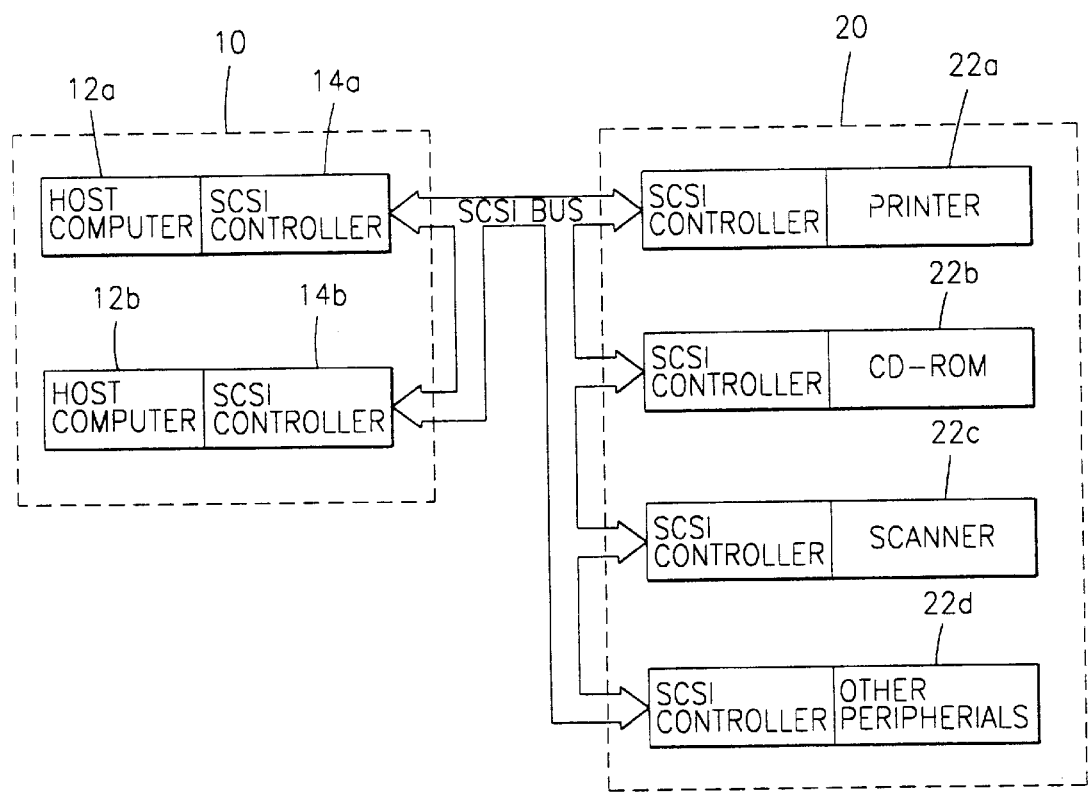
FIG. 1 is a schematic block diagram illustrating a conventional small size computer system interface (SCSI)
Figure 2:
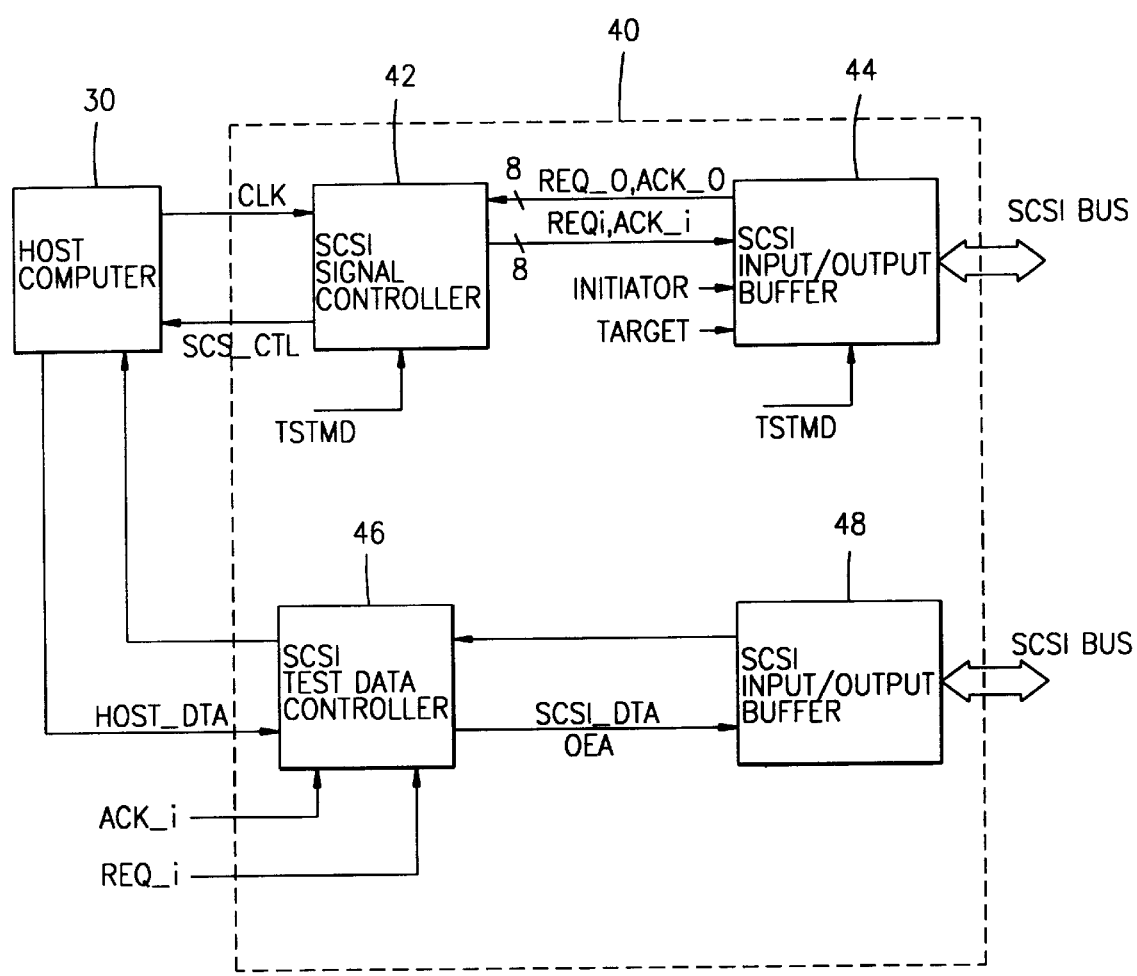
FIG. 2 is a schematic block diagram illustrating an apparatus for testing an SCSI controller according to the present invention.

FIG. 2 is a schematic block diagram illustrating an apparatus for testing a SCSI controller according to the present invention.

As shown therein, the apparatus for testing a SCSI controller according to the present invention includes a host computer 30 for inputting/outputting SCSI control data SCSI_CTL and SCSI test data HOST_DTA, and a SCSI controller 40 for temporarily storing the SCSI control data SCSI_CTL and the SCSI test data HOST_DTA from the host computer 30 and for outputting the stored data back to the host computer 30, for thus testing the system.

The SCSI controller 40 includes: a SCSI signal controller 42 for temporarily storing the SCSI control data SCSI_CTL from the host computer 30 (in accordance with a clock signal CLK from the host computer 30) and a test mode signal TSTMD (also from the host computer 30), a SCSI input/output buffer 44 for buffering the SCSI control data from the SCSI signal controller 42 and for outputting the buffered data back to the host computer 30 through the SCSI signal controller 42; a SCSI test data controller 46 for receiving and temporarily storing the SCSI test data HOST_DATA from the host computer 30; and a SCSI input/output buffer 48 for buffering the SCSI test data from the SCSI test data controller 46 and for outputting the SCSI test data back to the host computer 30 through the SCSI test data controller 46.

Figure 3:
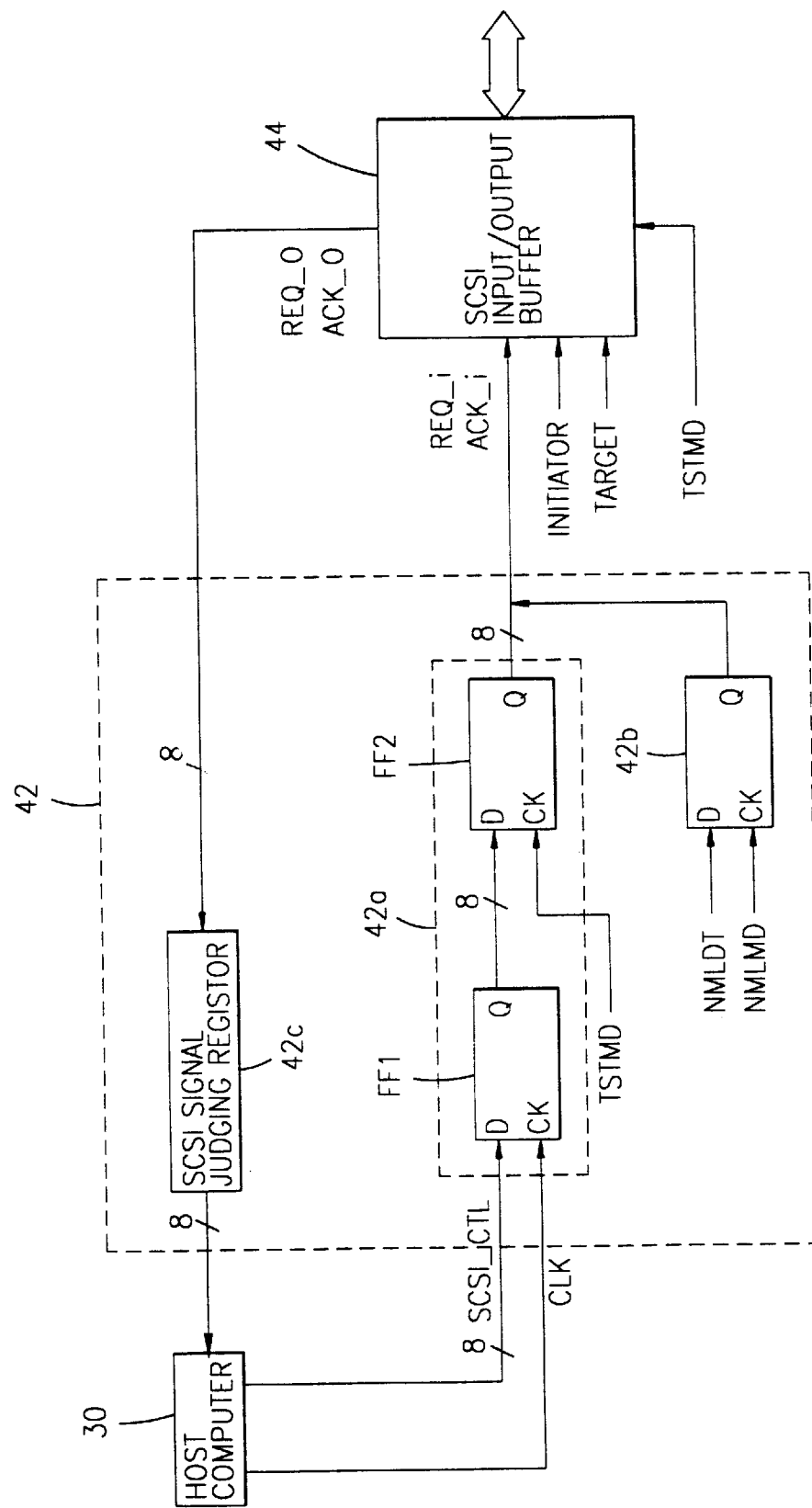
FIG. 3 is a detailed schematic block diagram illustrating an SCSI signal controller in the apparatus as shown in FIG. 2.

FIG. 3 is a detailed schematic block diagram illustrating the SCSI signal controller 42 as shown in FIG. 2.

In FIG. 3, the SCSI signal controller 42 includes: a SCSI signal writing register 42a for receiving and storing the SCSI control data SCSI_CTL from the host computer 30 in accordance with the clock signal CLK and for outputting the stored SCSI control data SCSI_CTL in accordance with the test mode signal TSTMD; a D type flip-flop 42b for latching a normal data signal NMLDT in accordance with a normal mode signal NMLMD and for outputting the latched normal data signal to the SCSI input/output buffer 44; and a SCSI signal judging register 42c for receiving and storing the SCSI control data REQ_O and ACK_O from the SCSI input/output buffer 44 in accordance with the depicted particular examples of SCSI control data, ACK_i and REQ_i, applied to the SCSI input/output buffer 44 from the SCSI signal writing register 42a and for outputting the stored control data to the host computer 30.

The SCSI signal writing register 42a includes a D type flip-flop FF1 for latching the SCSI control data SCSI_CTL, and a D type flip-flop FF2 for latching the control data latched by the flip-flop FF1 in accordance with the test mode signal TSTMD and for outputting the thusly latched control data to the SCSI input/output buffer 44.

The SCSI control data SCSI_CTL includes eight signals, BSY, SEL, C/D, I/O, MSG, REQ, ACK, and ATN.

In the SCSI signal writing register 42a as shown in FIG. 3, for simplicity there are shown only two flip-flops FF1 and FF2, but there are actually provided eight flip-flops for respectively latching all 8-bits of the possible SCSI_CTL data. Only the SCSI control data ACK_i and REQ_i which are outputted from the SCSI signal writing register 42a and then inputted to the SCSI input/output buffer 44 are shown for simplicity; they represent only two bits of the SCSI control data among the 8-bit data SCSI_CTL.

Figure 5:
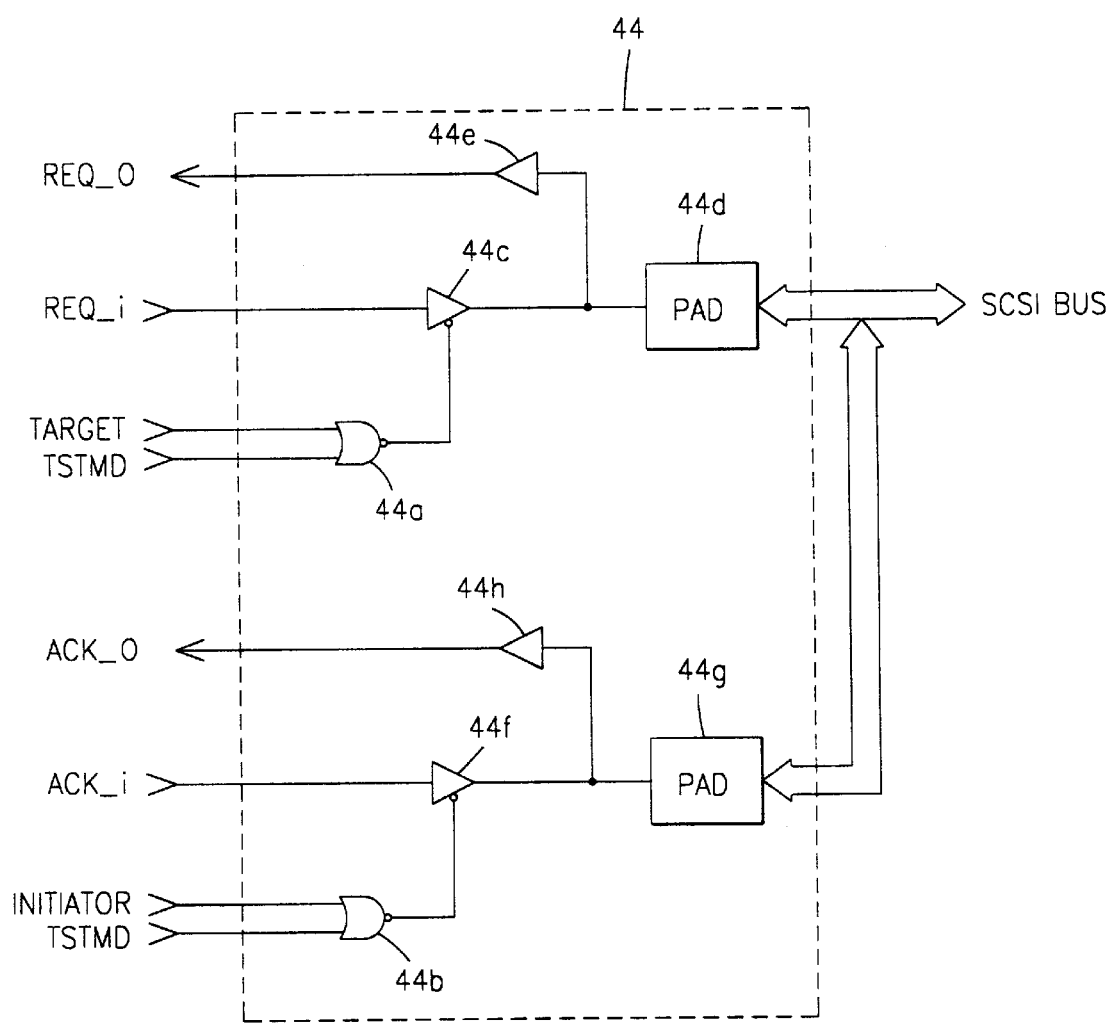
FIG. 5 is a detailed schematic circuit diagram illustrating an SCSI input/output buffer in the apparatus and signal controller as shown in FIGS. 2 and 3.

FIG. 5 is a detailed schematic circuit diagram illustrating a SCSI input/output buffer as shown in FIGS. 2 and 3.

In FIG. 5, the SCSI input/output buffer 44 includes: an a NOR-gate 44a for NoRing a target enabling signal TARGET and the test mode signal TSTMD; a NOR-gate 44b for NORing the test mode signal TSTMD and the initiator enabling signal INITIATOR; a tri-state buffer 44c for buffering the SCSI control data bit REQ_i in accordance with the output from the NOR-gate 44a; a pad 44d i.e., a contact pad or land, that provides a sufficient surface area to permit an electro-mechanical connection between a signal line connected to, an output terminal of the buffer 44c and a SCSI bus; a buffer 44e for buffering the output from the buffer 44c and for outputting the SCSI control data bit REQ_O to the SCSI signal judging register 42c of the SCSI signal controller 42; a tri-state buffer 44f for buffering the SCSI control data bit ACK_i in accordance with the output from the NOR-gate 44b that NORs the test mode signal TSTMD and the target enabling signal TARGET; a pad 44g connected with an output terminal of the buffer 44h and the SCSI bus; and a buffer 44h for buffering the output from the buffer 44f and for outputting the SCSI control data bit ACK_O to the SCSI signal judging register 42c of the SCSI signal controller 42.

Figure 4:
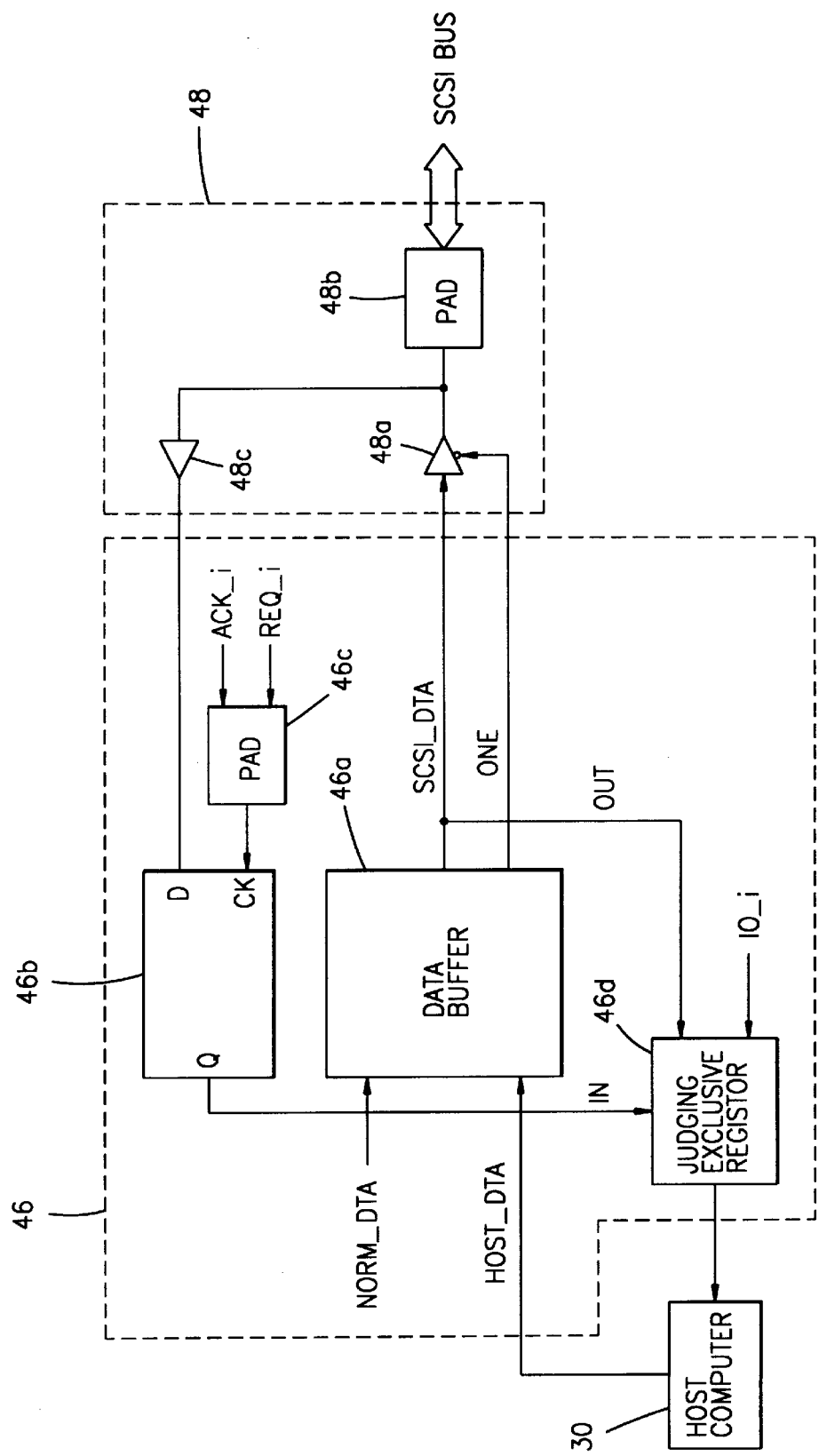
FIG. 4 is a detailed schematic block diagram illustrating an SCSI test data controller in the apparatus as shown in FIG. 2.

As shown in FIG. 4, the SCSI test data controller 46 includes: a data buffer 46a for buffering the data HOST_DTA from the host computer 30, and normal data NORM_DTA from the host computer 30 and for outputting the data SCSI_DTA and an output enable signal OEN to the input/out put buffer 48; a D type flip-flop 46b for receiving and latching the data SCSI_DTA from the data buffer 46a by way of the SCSI input/output buffer 48; a pad 46c; and a judging exclusive register 46d, which is enabled by a control signal IO_i (from the host computer 30), for receiving and storing the data latched by the flip-flop 46b through a path IN or the data SCSI_DTA from the data buffer 46a through a path OUT and for outputting the stored data to the host computer 30.

The SCSI test data controller 46 includes a pad 46c for transmitting a clock signal to the flip-flop 46b in accordance with the SCSI control data REQ_i and ACK_i from the SCSI signal controller 42 as shown in FIG. 2.

As shown in FIG. 4, the SCSI input/output buffer 48 includes: a tri-state buffer 48a for buffering the data SCSI_DTA from the data buffer 46a in accordance with the output enable signal OEN; a pad 48b connected with an output terminal of the buffer 48a and the SCSI bus; and a buffer 48c for buffering the data SCSI_DTA output from the buffer 48a and for outputting it to the flip-flop 46b.

The operation of the diagnosis test apparatus for a small computer system interface controller (SCSI) according to the present invention will now be explained with reference to the accompanying drawings.

First, in the test mode, the test mode signal TSTMD, the initiator enabling signal INITIATOR, the target enabling signal TARGET, and the control signal IO_i are at least indirectly received from the host computer 30, and in the normal mode, the normal mode signal NMLMD and the normal data NMLDT signals are received from the host computer 30, though not in the test mode.

The test mode signal TSTMD can be used to trigger a test at any time. Once triggered, in any phase of operation, the host computer 30 sends HOST_DTA to the SCSI test data controller 30.

The host computer 30 directly adjusts the SCSI control signal data BSY, SEL, C/D, I/O, MSG, REQ, ACK, and ATN, and the SCSI controller 40 is controlled by using the bidirectional bus to which the SCSI input/output buffers 44 and 48 are connected.

The control of the SCSI control signal data REQ and ACK will now be explained.

Generally, the SCSI control signal data REQ is generated in order for the target to request data. The host computer 30 out puts SCSI control signal data in the test mode.

Namely, when the host computer 30 outputs the SCSI control signal data REQ to the SCSI signal writing register 42a of the SCSI signal controller 42, the SCSI signal writing register 42a latches the data in accordance with the test mode signal TSTMD and outputs the SCSI control signal data REQ__i to the SCSI input/output buffer 44.

In response to the signal REQ__i from the register 42a, the tri-state buffer 44c of the SCSI input/output buffer 44, as shown in FIG. 5, outputs the SCSI control signal data REQ__i to the buffer 44e, not through the pad 44d to the SCSI bus because there is no target SCSI device connected to the SCSI bus.

The buffer 44e buffers the output from the buffer 44c and outputs the SCSI control signal data REQ__O to the SCSI signal judging register 42c of the SCSI signal controller 42.

Thereafter, the host computer 30 reads the SCSI control signal data REQ__O stored in the SCSI signal judging register 42c and judges whether the read SCSI control signal data REQ__O is outputted from the target, so that the SCSI control signal data ACK (one of the signals SCSI__CTL) is inputted to the SCSI signal writing register 42a of the SCSI signal controller 42.

The SCSI signal writing register 42a latches the SCSI control signal data ACK in accordance with the test mode signal TSTMD, and outputs the SCSI control signal data ACK__i to the SCSI input/output buffer 44. Thereafter, the SCSI control signal data ACK__O is stored in the SCSI signal judging register 42c in the above-described manner. The host computer 30 recognizes the SCSI control signal data ACK__O stored in the SCSI signal judging register 42c.

Next, the control of the test data will now be explained with reference to FIG. 4.

When the test data HOST__DTA is applied from the host computer 30 to the data buffer 46a of the SCSI test data controller 46, the data buffer 46a outputs the data SCSI__DTA to the judging exclusive register 46f and the SCSI input/output buffer 48. The data SCSI__DTA is applied to the flip-flop 46b through the SCSI input/output buffer 48, and the flip-flop 46b latches the inputted data, and outputs the data to the SCSI FIFO memory 46d and the judging exclusive register 46d, respectively.

The judging exclusive register 46f stores the data from the flip-flop 46b through the path IN in accordance with the control signal IO__i during the data input phase, and stores the data outputted from the data buffer 46a through the path OUT during the data output phase in accordance with the control signal IO__i.

Therefore, the host computer 30 reads the data stored in the judging exclusive register 46f and compares the read data with the data HOST__DTA (i.e., TEST__DTA in this case) from the data buffer 46a, for thus performing the test related to the data phase.

As described above, the diagnosis test apparatus for a small computer system interface (SCSI) controller according to the present invention receives the data fed-back through the bidirectional input/output buffer. The host computer 30 compares the signals normally generated for the target against the fedback signals, thus performing the testing.

In addition, the host computer generates a SCSI test data and a SCSI control signal data without using a peripheral SCSI device, For thus performing the test related to each SCSI phase, whereby it is possible to reduce the set-up time and cost.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A diagnosis test apparatus for a small computer system interface (SCSI) controller, comprising:
   a host computer for inputting/outputting SCSI control data and SCSI test data; and
   a SCSI controller for receiving and temporarily storing the SCSI control data and SCSI test data from the host computer and for outputting the stored test data to the host computer, for thus testing the SCSI controller;
   wherein said SCSI controller includes:
   a SCSI signal controller for receiving and temporally storing the SCSI control data from the host computer in accordance with a clock signal and a test mode signal;
   a first SCSI input/output buffer, connected between said SCSI signal controller and a SCSI bus, for buffering the SCSI control data from the SCSI signal controller and for outputting the buffered SCSI control data back to the host computer through the SCSI signal controller.
   an SCSI test data controller for receiving and temporally storing the SCSI test data from the host computer and for outputting the stored SCSI test data; and
   a second SCSI input/output buffer, connected between said SCSI test data controller and a SCSI bus, for buffering the SCSI test data from the SCSI test data controller and for outputting the buffered SCSI test data to the host computer through the SCSI test data controller.

2. The apparatus of claim 1, wherein said SCSI signal controller includes:
   a SCSI signal writing register for receiving and storing the SCSI control data from the host computer in accordance with a clock signal and for outputting the stored SCSI control data to the first SCSI input/output buffer in accordance with a test mode signal;
   a flip-flop for latching a normal data signal in accordance with a normal mode signal and for outputting the latched normal data signal to the first SCSI input/output buffer; and
   a SCSI signal judging register for storing the SCSI control data outputted from the first SCSI input/output buffer in accordance with the SCSI control data outputted from the SCSI signal writing register and for outputting the stored SCSI control data to the host computer.

3. The apparatus of claim 2, wherein said SCSI signal writing register includes a plurality of flip-flops for latching the SCSI control data in accordance with the clock signal and the test mode signal.

4. The apparatus of claim 1, wherein said first SCSI input/output buffer includes:
   a first NOR-gate for NORing the test mode signal and the initiator enabling signal;
   a first buffer for buffering inputted SCSI control data in accordance with an output from the first NOR-gate, an output of the first buffer being connected to a SCSI bus;

a second buffer for buffering an output from the first buffer and for outputting the SCSI control data to the SCSI signal judging register of the SCSI signal controller;

a second NOR-gate for NORing the test mode signal and the target enabling signal;

a third buffer for buffering the inputted SCSI control data in accordance with an output from the second NOR-gate, an output of the third buffer also being connected to the SCSI bus; and a fourth buffer for buffering said output from the third buffer and for outputting the SCSI control data to the SCSI signal judging register of the SCSI signal controller.

5. The apparatus of claim 1, wherein said SCSI test data controller includes:

a data buffer for buffering the SCSI test data from the host computer;

a flip-flop for receiving the buffered SCSI test data from the data buffer through an SCSI input/output buffer and for latching the buffered SCSI test data; and a reading exclusive register, which is enabled by a control signal, for receiving and storing the SCSI test data latched by the flip-flop through an input path and for receiving and storing the buffered SCSI test data from the data buffer through an output path and for outputting the stored SCSI test data to the host computer.

6. The apparatus of claim 1, wherein said second SCSI input/output buffer includes:

a first buffer for buffering the SCSI control data from the data buffer in accordance with an enable signal;

a pad connected with an output terminal of the first buffer and an SCSI bus; and a second buffer for buffering the SCSI control data output from the first buffer and for outputting the SCSI control data to the SCSI signal controller.

7. A diagnostic test system for a small computer system interface (SCSI), the system comprising:

a host computer for inputting/outputting SCSI test data and providing SCSI protocol control signals; and a SCSI controller, connected to said host computer, for receiving said SCSI test data and for returning said SCSI test data to said host computer without having to pass said SCSI test data through a peripheral SCSI device;

said host computer also being for comparing the SCSI test data provided by said host computer against the SCSI test returned by said controller;

wherein said SCSI controller includes:

a SCSI signal controller for receiving and temporally storing the SCSI control data from the host computer in accordance with a clock signal and a test mode signal;

a first SCSI input/output buffer, connected between said SCSI signal controller and a SCSI bus, for buffering the SCSI control data from the SCSI signal controller and for outputting the buffered SCSI control data back to the host computer through the SCSI signal controller;

an SCSI test data controller for receiving and temporally storing the SCSI test data from the host computer and for outputting the stored SCSI test data; and a second SCSI input/output buffer, connected between said SCSI test data controller and a SCSI bus, for buffering the SCSI test data from the SCSI test data controller and for outputting the buffered SCSI test data to the host computer through the SCSI test data controller.

8. A SCSI adapter comprising:

a SCSI signal controller to receive and temporarily store the SCSI control data from a host computer in accordance with a clock signal and a test mode signal;

a controllable first input/output buffer to connect said SCSI signal controller to a SCSI bus, said first input/output buffer being controllable according to control signals from said host computer;

a SCSI test data controller for receiving and temporarily storing the SCSI test data from the host computer and for outputting the stored SCSI test data; and a second controllable input/output buffer for connecting said SCSI signal controller to a SCSI bus, said second input/output buffer being controllable according to a control signal from said SCSI test data controller.

9. The SCSI adapter of claim 8, wherein said first input/output buffer includes a tri-state buffer controllable according to said control signals from said host computer.

10. The SCSI adapter of claim 8, wherein said second input/output buffer includes a tri-state buffer controllable according to said control signal from said SCSI test data controller.

* * * * *